(12) United States Patent
Lin et al.

(10) Patent No.: US 9,331,585 B1
(45) Date of Patent: May 3, 2016

(54) POWER CONTROL APPARATUS WITH DYNAMIC ADJUSTMENT OF DRIVING CAPABILITY

(71) Applicant: INNO-TECH CO., LTD., Taipei (TW)

(72) Inventors: Shu-Chia Lin, Taipei (TW); Ching-Yuan Lin, Taipei (TW); Chih Feng Lin, Taipei (TW); Wen-Yueh Hsieh, Taipei (TW)

(73) Assignee: INNO-TECH CO., LTD., Taipei (TW)

( * ) Notice: Subject to any disclaimer, the term of this patent is extended or adjusted under 35 U.S.C. 154(b) by 64 days.

(21) Appl. No.: 14/537,971

(22) Filed: Nov. 11, 2014

(51) Int. Cl.
*H02M 3/335* (2006.01)
*H02M 1/44* (2007.01)

(52) U.S. Cl.
CPC .......... *H02M 3/33507* (2013.01); *H02M 1/44* (2013.01)

(58) Field of Classification Search
CPC . H02M 3/338; H02M 3/335; H02M 3/33507; H02M 3/33523
USPC ................. 363/18, 21.04, 21.09, 21.07, 21.1, 363/21.11, 21.12, 21.15, 21.16–21.17, 363/21.18
See application file for complete search history.

(56) References Cited

U.S. PATENT DOCUMENTS

| | | | | |
|---|---|---|---|---|
| 5,828,558 A * | 10/1998 | Korcharz | .......... | H02M 3/33515 363/20 |
| 7,433,210 B2 * | 10/2008 | Meitzner | .......... | H02M 3/33523 363/21.12 |
| 2012/0195620 A1 * | 8/2012 | Matsumoto | .......... | G03G 15/80 399/88 |

* cited by examiner

*Primary Examiner* — Nguyen Tran
(74) *Attorney, Agent, or Firm* — Lin & Associates Intellectual Property, Inc.

(57) ABSTRACT

A power control apparatus with dynamical adjustment of driving capability for converting an input power into an output power includes a transformer, a switch transistor connected to the transformer, a pulsed width modulation (PWM) driving controller generating a PWM signal and connected to the switch transistor, an isolation element, an output diode and an output capacitor. The first side coil of the transformer and the switch transistor are connected to the input power, the second side coil of the transformer is connected to the output diode and further connected to the output capacitor and an external load. The isolation element converts the output power into a feedback signal providing the PWM driving controller to dynamically control the PWM driving signal through adjustment so as to implement the optimal turn-on current for the switch transistor. Therefore, electrical performance and conversion efficiency are greatly improved by reducing the switching loss.

8 Claims, 3 Drawing Sheets

POWER CONTROL APPARATUS WITH DYNAMIC ADJUSTMENT OF DRIVING CAPABILITY

BACKGROUND OF THE INVENTION

1. Field of the Invention

The present invention generally relates to a power control apparatus, and more specifically to a power control apparatus for dynamically controlling the PWM driving signal through adjustment according to the operation state of the switch transistor in consideration of electromagnetic interference (EMI) and the switching loss so as to improve overall electrical performance and conversion efficiency.

2. The Prior Arts

Lately, power conversion efficiency has been a crucial topic for various electronic products, which need different voltage or current of electric power to normally operation. For instance, integrated circuits (ICs) need 5V or 3V, electric motors need 12V DC power, and lamps of LCD monitors need much higher voltage like 1150V. Thus, it is needed for power converters to meet the requirements of actual applications In the prior arts, the scheme of switching power conversion is one of the primary technologies of power conversion, and generally employs the pulsed width modulation (PWM) signal at high frequency to drive the switch transistor (or called driving transistor) to turn on so as to control the current of the inductors (or transformer) connected in series to the switch transistor. When the switch transistor is turned off, the current flowing through the inductor does not stop but gradually changes because the inductor has an effect of sustaining the current to avoid abrupt change. Thus, the inductor is charged or discharged, thereby attaining the purpose of changing the output voltage.

Please refer to FIG. 1 showing the adjustment of driving capability for the switch transistor in the prior arts. The driving signal VD1 is generated by the pre-driver to provide fixed driving capability through a source current/sink current architecture. To adjust driving capability of the switch transistor M1, the first gate resistor RG1, the second gate resistor RG2, the switch diode D1 and the pull-low resistor RGG are used. The first gate resistor RG1 and the second gate resistor RG2 are connected in series, wherein first gate resistor RG1 receives the driving signal VD1 and the second gate resistor RG2 drives the gate G of the switch transistor M1. Additionally, the switch diode D1 and the second gate resistor RG2 are parallel connected, and the pull-low resistor RGG is connected across the gate G of the switch transistor M1 and the ground GND. Thus, to turn on the switch transistor M1, the driving signal VD1 controls the driving current IG1 to flow through the first gate resistor RG1 and the second gate resistor RG2 to the gate G of the switch transistor M1. At this time, the switch diode is reverse biased and turned off, and the voltage of the gate G is increased to turn on the switch transistor M1. To turn off When the switch transistor M1, the driving signal VD1 is reduced such that the voltage of the gate G drops because of the turn-off current IG2. Specifically, the switch diode is turned on due to forward biasing, and the turn-off current IG2 flows through the switch diode D1 and the second gate resistor RG2, instead of flowing through the first gate resistor Rg1. Additionally, the turn-off current IG2 may flow to the ground GND through the pull-low resistor RGG.

For example, in the turn-off operation of the switch transistor M1, when the first gate resistor RG1 is 0Ω (ohm) and the second gate resistor is 22Ω, the falling time for the drain-source voltage (Vds) of the switch transistor M1 is about 80 ns, and the time for Miller plateau of the gate-source voltage (Vgs) of the switch transistor M1 is about 200 ns. Alternatively, if the first gate resistor RG1 and the second gate resistor are 100Ω (ohm) and 22Ω, respectively, the falling time is prolonged to about 104 ns, and the time for Miller plateau is increased up to about 300 ns. Thus, power conversion efficiency can be increased by reducing the first gate resistor RG1 and the second gate resistor RG2, but EMI issue is still not improved. While EMI can be reduced by increasing the first gate resistor RG1 and the second gate resistor RG2 to prolong the falling time, Miller plateau extends too much and the effective turn-on resistance of the switch transistor M1 can not fast decrease. As a result, power conversion efficiency is adversely affected.

It is obvious that the adjustment function for driving capability in the above traditional scheme is implemented by changing the first gate resistor RG1 and the second gate resistor RG2 to control the turn-off speed for the switch transistor M1. However, one drawback in the prior arts is that the first gate resistor RG1 and the second gate resistor RG2 can not be dynamically changed during switching operation to control the driving signal VD1 to adjust the turn-on time and the turn-off time for the switch transistor M1. While it is possible to reduce switching loss, EMI issue is not solved. In other words, during the turn-on process of the switch transistor M1, when the original state of the switch transistor M1 is turn-off and the turn-on current is zero or approximately zero, fast rising the driving signal VD1 dose not improve switching loss issue, but causes EMI to get worse. Alternatively, when the switch transistor is partly or fully turned on, the turn-on current is considerable, and at this time, slowing down the rising speed and the falling speed of the driving signal VD1 may result in larger power consumption at switching transition.

Therefore, it is greatly needed for the power control apparatus with dynamical adjustment of driving capability, which employs the feedback signal to perform the adjustment process to dynamically adjust the PWM driving signal based on the operation state of the switch transistor and consideration of EMI and switching loss, thereby overcoming the above problems in the prior arts.

SUMMARY OF THE INVENTION

A primary object of the present invention is to provide a power control apparatus with dynamical adjustment of driving capability, comprising a transformer, a pulsed width modulation (PWM) driving controller, a switch transistor, an isolation element, an output diode and an output capacitor so as to increase the EMI margin, reduce the switching loss and improve the efficiency of power conversion. Specifically, the PWM driving controller is connected to the switch transistor, and the switch transistor is connected to the transformer, which includes the first side coil and the second side coil. The first side coil is connected to the input power and serially to the switch transistor such that the switch transistor controls the current of the first side coil. Additionally, the second side coil is connected to the output diode to supply the output power to the external load. In particular, the isolation element is connected to one end of the external load to convert the output power into the feedback signal, which is transferred back to the PWM driving controller, such that the PWM driving controller performs the adjustment process based on the feedback signal to generate the PWM driving signal, thereby driving the switch transistor.

The above adjustment operation performed by the PWM driving controller comprising steps of: initially, when the initial turn-on current is smaller at continuous conduction mode (CCM) or the initial turn-on current Ion is just zero at discontinuous conduction mode (DCM), increasing the driving voltage of the PWM driving signal of the PWM driving controller from zero voltage to the first voltage like 5V during the first rising period in consideration of EMI issue; next, since the transition process of the voltage and current of the switch transistor are completed, increasing the driving voltage from the first voltage to the second voltage like 8V larger than the first voltage during the second rising period to assure the switch transistor is turned on such that the turn-on resistance is as small as possible and the second rising period is decreased; sustaining the driving voltage for a preset period; then, lowering the driving voltage from the second voltage to the first voltage during the first falling period to turn off the switch transistor, wherein the first falling period is shortened as much as possible; and finally, lowering the driving voltage from the first voltage to zero voltage during a second falling period, wherein the second falling period is shortened as much as possible.

In general, the EMI effect is improved by prolonging the first rising period, and the switching loss is reduced by shortening the second rising period, the first falling period and the second falling period. Therefore, the present invention is greatly applicable to the application field of power conversion which takes consideration of both EMI issue and power conversion efficiency.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 1:
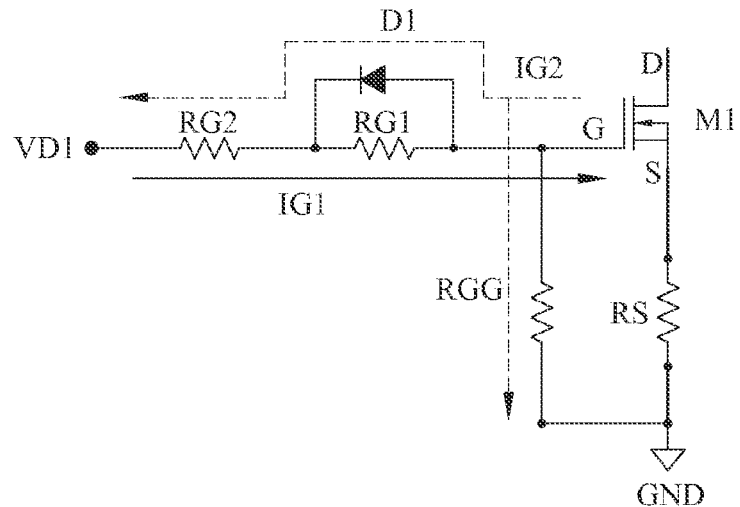
FIG. 1 is an illustrative view showing the adjustment of driving capability for the switch transistor in the prior arts.
Figure 2:
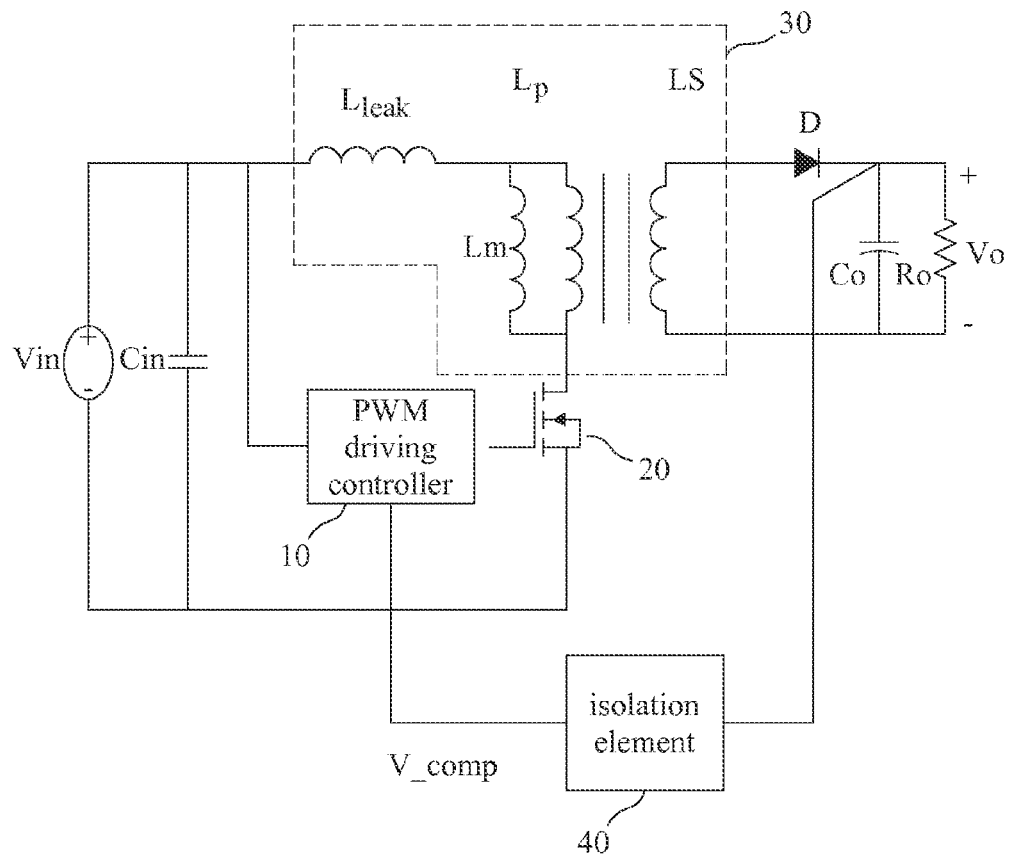
FIG. 2 is a view of the power control apparatus for dynamically controlling the PWM driving signal through adjustment according to one embodiment of the present invention.

Please refer to FIG. 2 showing the power control apparatus with dynamical adjustment of driving capability according to one embodiment of the present invention. As shown in FIG. 2, the power control apparatus of the present invention comprises a pulsed width modulation (PWM) driving controller 10, a switch transistor 20, a transformer 30, an isolation element 40, an output diode D and an output capacitor Co for converting an input power with an input voltage Vin into an output power with an output voltage Vo, which is supplied to an external load Ro. The transformer 30, the PWM driving controller 10, the switch transistor 20 and the input power with the input voltage Vin are configured as a driving control loop, and the transformer 30, the output diode D, the output capacitor Co and the isolation element 40 form a feedback loop to generate a feedback signal like a feedback voltage V_comp in FIG. 2. The external load Ro is parallel connected to the output capacitor Co, and the terminal voltage of the output capacitor Co is the output voltage Vo of the output power.

Specifically, the PWM driving controller 10 is connected to the switch transistor 20 for performing an adjustment operation so as to generate a PWM driving signal VD for controlling the switching transistor 20 to turn on. Additionally, the transformer 30 generally comprises a first side coil Lp and a second side coil Ls, and the first side coil Lp includes a magnetizing inductor Lm for coupling the magnetic flux generated to the second side coil Ls, and a leakage inductor Lleak for not coupling the magnetic flux to the second side coil Ls. In particular, one end of the first side coil Lp is connected to a drain of the switch transistor 20, the PWM driving controller 10 is connected to a gate of the switch transistor 20, the output voltage Vo of the output power is connected to another end of the first side coil Lp and a source of the switch transistor 20, and the another end of the first side coil Lp is further connected to the PWM driving controller 10. One end of the second coil Ls is connected to a positive terminal of the output diode D, and a negative terminal of the output diode D is connected to one end of the output capacitor Co and one end of the isolation element 40. The isolation element 40 converts the output voltage Vo into the feedback signal such as the feedback voltage V_comp, which is transferred to the PWM driving controller 10 through another end of the isolation element 40.

It should be noted that the above feedback signal can be any electrical signal rather than the feedback voltage V_comp like the feedback current or the feedback power related to the output power. Furthermore, the input power can be the direct current (DC) power through a rectifying bridge the general city power. In other words, the city power is 110V or 220V alternating current (AC) power, and the input voltage Vin is 110V or 220V. To remove high frequency noise in the input voltage Vin, an additional input capacitor Cin across the input power is employed, thereby stabilizing the input power.

The PWM driving controller 10 may comprise a single chip like microcontroller (MCU) or central processing unit (CPU), or is implemented by a circuit formed of a plurality of discrete electronic elements. Thus, the PWM driving controller 10 substantially performs digital operation instead of analog operation in the prior arts. The switch transistor 20 is implemented by an N type switching element such as an N-channel Metal-Oxide Semiconductor (NMOS) or an NPN bipolar transistor. Additionally, the isolation element 40 includes a photocoupler or a specific circuit formed of at least one passive element like resistor or capacitor.

To clearly explain the actual operation of the present invention, the NOMS transistor is selected as the switch transistor 20 in the example as below.

Figure 3:
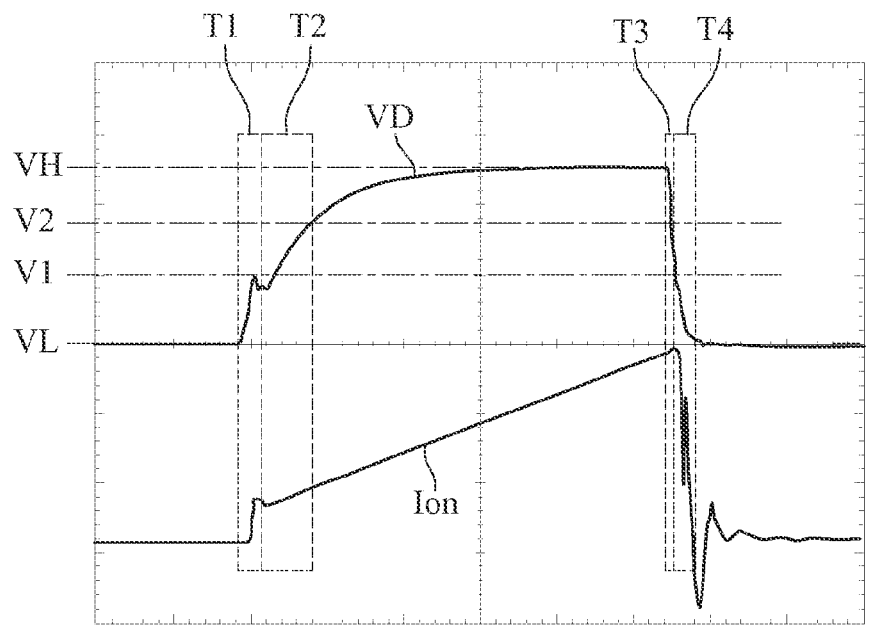
FIG. 3 is a waveform diagram showing the first increasing period, the second increasing period, the first decreasing period and the second decreasing period according to the present invention.
Figure 4:
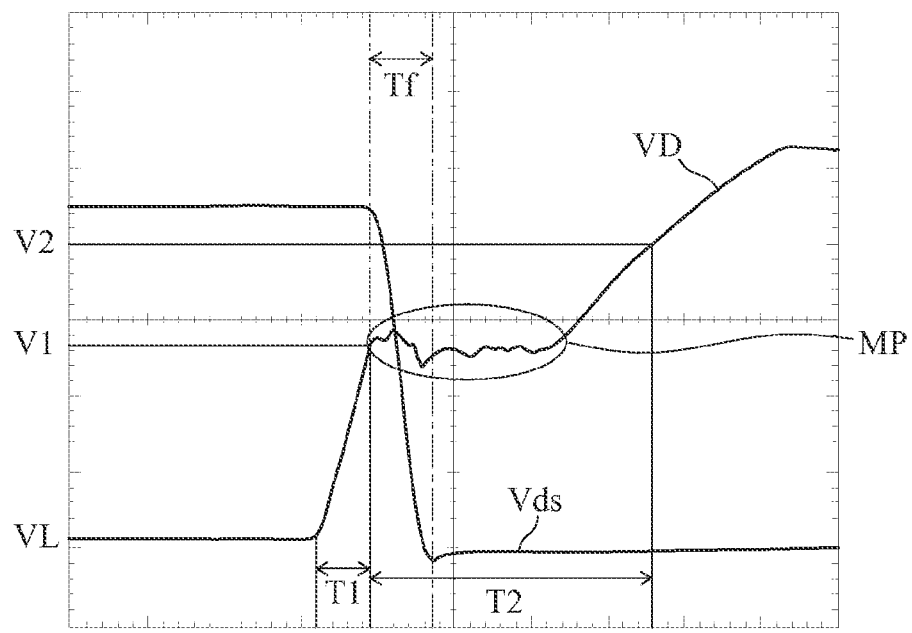
FIG. 4 is a waveform diagram showing the turn-on process of the driving voltage according to the present invention.
Figure 5:
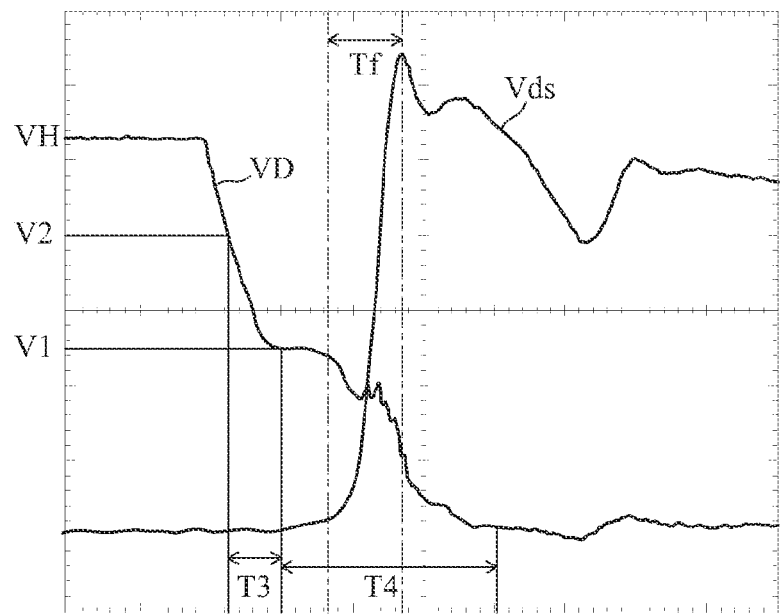
FIG. 5 is a waveform diagram showing the turn-off process of the driving voltage according to the present invention.

The PWM driving controller 10 determines the loading state of the external load Ro based on the feedback signal from the isolation element 40, and performs the following steps for the adjustment process with reference to FIGS. 3, 4 and 5. during the first rising period T1, increasing the driving voltage of the PWM driving signal VD of the PWM diving controller from zero voltage to the first voltage V1; during the second rising period T2, increasing the driving voltage from the first voltage to the second voltage V2 or more than the second voltage V2 which is larger than the first voltage V1, for beginning to turn on the switch transistor 20 such that the drain-source voltage (Vds) of the switch transistor 20 is lowered; sustaining the driving voltage for a preset period; lowering the driving voltage from the second voltage V2 or more than the second voltage V2 to the first voltage v1 during the first falling period T3; and lowering the driving voltage of the PWM driving signal VD from the first voltage V1 to zero voltage during the second falling period T4.

More specifically, the first voltage V1 is intended for beginning to turn on the switch transistor 20 such that the drain-source voltage (Vds) of the switch transistor 20 is lowered. The second voltage V2 is intended to fully turn on the switch transistor 20. Thus, the first voltage V1 can be 3V to 6V and the second voltage V2 can be 7V to 9V. For clearly explain the aspects of the present invention, the first voltage V1 and the second voltage V2 are preferred selected as 5V and 8V, respectively, in the following embodiments. Also, the first voltage V1 is about Miller plateau of the switch transistor 20, wherein Miller plateau is referred to the specific gate-source voltage Vgs, which is maintained as a constant during the switching transition from the turn-off state to the turn-on state or from the turn-on state to the turn-off state. Particularly, the first rising period T1 is prolonged to reduce EMI when the drain current Id of the switch transistor 20 is zero. This is because the switching loss is not affected during the time when the drain current Id is zero. In other words, the rising speed of the driving voltage of the PWM driving signal VD from zero voltage to the first voltage V1 is increased as much as possible within the requirement of EMI or to minimize EMI effect. At the same time, the second rising period T2, the first falling period T3 and the second falling period T4 are shortened as much as possible to reduce or minimize the switching loss because the drain current ID is not zero and the slower speed causes power consumption to increase, thereby lowering the overall power conversion efficiency. Thus, the first rising period T1, the second rising period T2, the first falling period T3 and the second falling period T4 are adjust by dynamically increasing or decreasing the driving capability of the PWM driving controller 10.

It should be noted that the corresponding driving voltage is reversed in case of PMOS transistor, and the rising and falling periods are also reversed so as to properly control the turn-on and turn-off operations for the PMOS transistor.

The following description illustrates the specific effect of the above adjustment process.

First, the switching loss is not needed to considered but EMI effect is taken in consideration when the initial turn-on current Ion is smaller at continuous conduction mode (CCM) like the very beginning of power conversion, or the initial turn-on current Ion is just zero at discontinuous conduction mode (DCM). That is, EMI is reduced as much as possible. This is achieved by properly prolonging the first rising period T1.

For the second rising period T2 when the PWM driving signal VD is increased from the first voltage V1 like 5V to the second voltage V2 like 8V, the voltage and current of the switch transistor 20 are switched and completed, and the turn-on current Ion thus increases. To reduce the turn-on loss, it is needed to rise the PWM driving signal VD to exceed the second voltage V2 like 8V so as to assure that the switch transistor 20 fast enter into the saturation state to minimize the turn-on resistance and the switching loss.

The first falling period T3 for the PWM driving signal VD is substantially the time for the transition reversed to the second rising period T2. At this time, the voltage and current of the switch transistor 20 are not yet completed, so if the PWM driving signal VD is lowered too slow, the turn-on consumption is increased. Therefore, the first falling period T3 is needed to shorten in order to fast reduce the turn-on current Ion.

Similarly, the second falling period T4 is substantially the time for the transition reversed to the first rising period T1. At this time, the turn-on current Ion is larger and the efficiency has to be first considered. That is, the second falling period T4 is needed to properly shorten to fast turn on the switch transistor 20, thereby lowering the turn-on current Ion to zero or about zero.

Thus, the present invention performs the adjustment process based on the feedback signal to optimally adjust the PWM driving signal so as to change the driving capability of the switch transistor (the driving transistor or the driver). At the same time, both EMI effect and the turn-on loss are optimized to not only improve electrical performance but also greatly increase the overall efficiency of electrical conversion.

From the above mention, one primary feature of the present invention is that the adjustment process is performed by the PWM driving controller, and the turn-on speed of the switch transistor is slowed down as much as possible when the initial turn-on current of the switch transistor is zero under the DCM so as to reduce the slope of transient voltage, increase the EMI margin and decrease the EMI effect. Furthermore, when the initial turn-on current is not zero under the DCM, speed up the turn-on speed of the switch transistor as much as possible to reduce the switching loss, thereby improving the efficiency of power conversion and assuring the electrical performance.

While the present invention is provided with the second side feedback scheme and basically described according to the illustrative circuit shown in FIG. 2, the present invention is actually applicable to other electrical system including the isolation system (comprising the transformer), the isolated buck/boost system, the non-isolation system, and so on. In particular, the feedback scheme can be implemented by the first side feedback.

Figure 6:
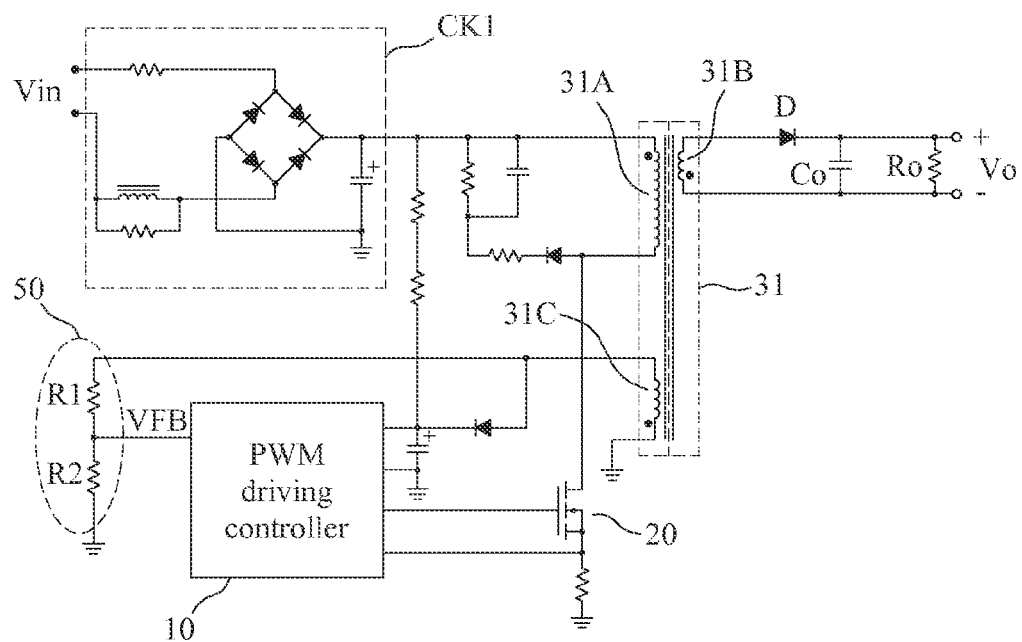
FIG. 6 is a view of the power control apparatus according to another embodiment of the present invention.

To further explain the aspect of the present invention, please refer to FIG. 6 showing the power control apparatus according to another embodiment of the present invention, which employs the first side feedback scheme to control the output power.

As shown in FIG. 6, the power control apparatus of the present embodiment is similar to the power control apparatus illustrated in FIG. 2, but one primary difference is that the transformer 31 comprises the first side coil 31A, the second side coil 31B and the subsidiary coil 31C. More specifically, the first side coil 31A is directly connected to the input power Vin and further connected to the switch transistor 20 in series. The switch transistor 20 controls the current of the first side coil 31A. The second side coil 31B is connected to the output diode Co to supply the output power to the load Ro. In particular, the first side coil 31A, the second side coil 31B and the subsidiary coil 31C are coupled with each other. The load feedback unit 50 is used to implement a feedback loop, and comprises two resistors R1 and R2, which are connected in series. The load feedback unit 50 is connected to the subsidiary coil 31C, and a connection point of the two resistors R1 and R2 generates a load feedback signal VFB as a feedback signal, which is transferred back to the PWM driving controller 10 and provides a feedback function similar to the feedback voltage V_comp in FIG. 2. Based on the load feedback signal VFB, the PWM driving controller 10 generates the PWM driving signal VD for controlling the switching transistor 20 to turn on.

The PWM driving controller 10 of the present embodiment employs the load feedback signal VFB to determine the current loading state of the load Ro, and the actual electrical waveforms for illustrating the turn-on and turn-off operation of the dynamical adjustment of driving capability are shown in FIGS. 3, 4 and 5. Since the dynamical adjustment operation is similar, the detailed explanation is omitted.

Moreover, the present embodiment further comprises an input power circuit CK1 for performing rectification and filtration on the input power Vin so as to obtain a direct current power transferred to the transformer 31.

Therefore, the present invention may employ the first side feedback loop or the second side feedback loop to achieve the sensing function for the loading state so as to dynamically adjust the driving capability of the switch transistor in any switching power system, thereby greatly improving the whole operation efficiency.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A power control apparatus with dynamical adjustment of driving capability for converting an input power with an input voltage into an output power with an output voltage supplied to an external load, comprising:
    a switch transistor being an N type switching element comprising an N-channel Metal-Oxide Semiconductor (NMOS) or an NPN bipolar transistor:
    a pulsed width modulation (PWM) driving controller connected to the switch transistor, performing a adjustment operation and generating a PWM driving signal for controlling the switch transistor to turn on;
    an output diode;
    an output capacitor parallel connected to the output diode;
    a transformer comprising a first side coil and a second side coil, wherein the first side coil is connected to the input power and further connected to the switch transistor in series, the switch transistor controls the current of the first side coil, the second side coil is connected to the output diode to supply the output power to the load; and
    an isolation element connected to one end of the load so as to convert the output power into a feedback signal transferred back to the PWM driving controller,
    wherein the adjustment operation performed by the PWM driving controller comprising steps of;
    during a first rising period, increasing a driving voltage of the PWM driving signal from zero voltage to a first voltage for beginning to turn on the switch transistor such that a drain-source voltage (Vds) of the switch transistor is lowered;
    during a second rising period, increasing the driving voltage from the first voltage to a second voltage or more than the second voltage which is larger than the first voltage, for beginning to turn on the switch transistor such that a drain-source voltage (Vds) of the switch transistor is lowered;
    sustaining the driving voltage for a preset period;
    lowering the driving voltage from the second voltage or more than the second voltage to the first voltage during a first falling period; and
    lowering the driving voltage from the first voltage to zero voltage during a second falling period,
    wherein the first voltage is about Miller plateau for the switch transistor, the Miller plateau is referred to a specific constant gate-source voltage (Vgs) lasting for a period of time when the switch transistor shifts from a turn-off state to a turn-on state or from the turn-on state to the turn-off state, the first rising period is prolonged as much as possible to minimize electromagnetic interference, and the second rising period, the first falling period and the second falling period are shortened as much as possible to reduce switching loss.

2. The power control apparatus according to claim 1, wherein the first voltage is 3V to 6V, and the second voltage is 7V to 9V.

3. The power control apparatus as claimed in claim 1, wherein a drain-source voltage falling time and a drain-source voltage rising time of the switch transistor are less than 200 ns and 100 ns, respectively, the drain-source voltage falling time means a time when the drain-source voltage of the switch transistor lowers from a highest drain-source voltage to a lowest drain-source voltage during a turn-on process, and the drain-source voltage rising time means a time when the drain-source voltage of the switch transistor increases from the lowest drain-source voltage to the highest drain-source voltage during a turn-off process.

4. The power control apparatus as claimed in claim 1, wherein the first rising period, the second rising period, the first falling period and the second falling period are prolonged or shortened to dynamically adjust the driving capability of the PWM driving controller.

5. A power control apparatus with dynamical adjustment of driving capability for converting an input power with an input voltage into an output power with an output voltage supplied to an external load, comprising:
    a switch transistor being an N type switching element comprising an N-channel Metal-Oxide Semiconductor or an NPN bipolar transistor:
    a pulsed width modulation (PWM) driving controller connected to the switch transistor, performing a adjustment operation and generating a PWM driving signal for controlling the switch transistor to turn on;
    an output diode;
    an output capacitor parallel connected to the output diode;
    a transformer comprising a first side coil, a second side coil and a subsidiary coil, wherein the first side coil is connected to the input power directly or through an input power circuit, and further connected to the switch transistor in series, the switch transistor controls the current of the first side coil, the second side coil is connected to the output diode to supply the output power to the load, and the subsidiary coil, the first side coil and the second side coil are coupled with each other; and
    a load feedback unit connected to the subsidiary coil and comprising two resistors in series, which have a connection point generating a load feedback signal as a feedback signal transferred back to the PWM driving controller;
    wherein the adjustment operation performed by the PWM driving controller comprising steps of;
    during a first rising period, increasing a driving voltage of the PWM driving signal from zero voltage to a first voltage for beginning to turn on the switch transistor such that a drain-source voltage (Vds) of the switch transistor is lowered;
    during a second rising period, increasing the driving voltage from the first voltage to a second voltage or more than the second voltage which is larger than the first voltage, for beginning to turn on the switch transistor such that a drain-source voltage (Vds) of the switch transistor is lowered;

sustaining the driving voltage for a preset period;

lowering the driving voltage from the second voltage or more than the second voltage to the first voltage during a first falling period; and lowering the driving voltage from the first voltage to zero voltage during a second falling period, wherein the first voltage is about Miller plateau for the switch transistor, the Miller plateau is referred to a specific constant gate-source voltage (Vgs) lasting for a period of time when the switch transistor shifts from a turn-off state to a turn-on state or from the turn-on state to the turn-off state, the first rising period is prolonged as much as possible to minimize electromagnetic interference, and the second rising period, the first falling period and the second falling period are shortened as much as possible to reduce switching loss.

6. The power control apparatus according to claim 5, wherein the first voltage is 3V to 6V, and the second voltage is 7V to 9V.

7. The power control apparatus as claimed in claim 5, wherein a drain-source voltage falling time and a drain-source voltage rising time of the switch transistor are less than 200 ns and 100 ns, respectively, the drain-source voltage falling time means a time when the drain-source voltage of the switch transistor lowers from a highest drain-source voltage to a lowest drain-source voltage during a turn-on process, and the drain-source voltage rising time means a time when the drain-source voltage of the switch transistor increases from the lowest drain-source voltage to the highest drain-source voltage during a turn-off process.

8. The power control apparatus as claimed in claim 5, wherein the first rising period, the second rising period, the first falling period and the second falling period are prolonged or shortened to dynamically adjust the driving capability of the PWM driving controller.

* * * * *